United States Patent
Rice

(10) Patent No.: US 11,749,083 B2
(45) Date of Patent: Sep. 5, 2023

(54) METHOD AND APPARATUS FOR OPTICAL ICE DETECTION

(71) Applicant: UNIVERSITY OF WYOMING, Laramie, WY (US)

(72) Inventor: William D. Rice, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 17/068,036

(22) Filed: Oct. 12, 2020

(65) Prior Publication Data

US 2021/0110693 A1  Apr. 15, 2021

Related U.S. Application Data

(60) Provisional application No. 62/914,437, filed on Oct. 12, 2019.

(51) Int. Cl.
*G08B 19/02* (2006.01)
*G01S 7/499* (2006.01)
*G01N 21/65* (2006.01)

(52) U.S. Cl.
CPC ............. *G08B 19/02* (2013.01); *G01N 21/65* (2013.01); *G01S 7/499* (2013.01)

(58) Field of Classification Search
CPC .................... G08B 19/02; G01N 21/65; G01N 2021/1761; G01S 7/499; G01L 1/24; G01L 1/25
See application file for complete search history.

(56) References Cited

U.S. PATENT DOCUMENTS

| 5,500,530 A * | 3/1996 | Gregoris | G01N 21/359 |
| | | | 250/341.8 |
| 5,921,501 A * | 7/1999 | Pernick | B64D 15/20 |
| | | | 244/134 F |
| 7,370,525 B1 * | 5/2008 | Zhao | B64D 15/20 |
| | | | 73/170.21 |
| 8,325,338 B1 * | 12/2012 | Pope | G01N 21/65 |
| | | | 356/301 |
| 10,775,311 B2 * | 9/2020 | Delpoux | G01N 21/75 |
| 2012/0193477 A1 * | 8/2012 | Thorez | B64D 15/20 |
| | | | 244/134 F |

OTHER PUBLICATIONS

D. Graf, F. Molitor, K. Ensslin, C. Stampfer, A. Jungen, C. Hierold, L. Wirtz, Nano Lett. 2007, 7, 238.
(Continued)

*Primary Examiner* — Toan N Pham
(74) *Attorney, Agent, or Firm* — Patterson + Sheridan, LLP

(57) ABSTRACT

In an embodiment, an optical ice detection method is provided. The method includes contacting a multilayer structure with water under conditions effective to form ice, the multilayer structure comprising an optically transparent or semi-transparent material disposed over at least a portion of a material probe. The method further includes performing Raman spectroscopy on one or more of the material probe, water, or ice to obtain Raman spectra, detecting a shift in the Raman spectra, and calculating ice-induced strain in the material probe. Apparatus for optically detecting ice are also provided.

20 Claims, 6 Drawing Sheets
(1 of 6 Drawing Sheet(s) Filed in Color)

(56) References Cited

OTHER PUBLICATIONS

I. Calizo, A. A. Balandin, W. Bao, F. Miao, C. N. Lau, Nano Lett. 2007, 7, 2645.
H. Zhou, C. Qiu, F. Yu, H. Yang, M. Chen, L. Hu, Y. Guo, L. Sun, J. Phys. D: Appl. Phys. 2011, 44, 185404.
C. Metzger, S. Rémi, M. Liu, S. V. Kusminskiy, A. H. C. Neto, A. K. Swan, B. B. Goldberg, Nano Lett. 2010, 10, 6.
Z. H. Ni, T. Yu, Y. H. Lu, Y. Y. Wang, Y. P. Feng, Z. X. Shen, ACS Nano 2008, 2, 2301.
F. Ding, H. Ji, Y. Chen, A. Herklotz, K. Dörr, Y. Mei, A. Rastelli, O. G. Schmidt, Nano Lett. 2010, 10, 3453.
D. Yoon, Y.-W. Son, H. Cheong, Nano Lett. 2011, 11, 3227.
N. Sonwalkar, S. S. Sunder, S. K. Sharma, J. Raman Spect. 1991, 22, 551.
N. Sonwalkar, S. S. Sunder, S. K. Sharma, Appl. Spect. 1993, 47, 1585.
J. F. D. Liljeblad, I. Furó, E. C. Tyrode, Phys. Chem. Chem. Phys. 2017, 19, 305.
G. Grimvall, Thermophysical Properties of Materials, Elsevier, Amsterdam, The Netherlands 1999.
Y. Shin, M. Lozada-Hidalgo, J. L. Sambricio, I. V. Grigorieva, A. K. Geim, C. Casiraghi, Appl. Phys. Lett. 2016, 108, 221907.
C. Bousige, F. Balima, D. Machon, G. S. Pinheiro, A. Torres-Dias, J. Nicolle, D. Kalita, N. Bendiab, L. Marty, V. Bouchiat, G. Montagnac, A. G. S. Filho, P. Poncharal, A. San-Miguel, Nano Lett. 2016, 17, 21.
C. Lee, X. Wei, J. W. Kysar, J. Hone, Science 2008, 321, 385.
S. P. Koenig, N. G. Boddeti, M. L. Dunn, J. S. Bunch, Nat. Nanotechnol. 2011, 6, 543.
C. Casiraghi, S. Pisana, K. S. Novoselov, A. K. Geim, A. C. Ferrari, Appl. Phys. Lett. 2007, 91, 233108.
A. Das, B. Chakraborty, S. Piscanec, S. Pisana, A. K. Sood, A. C. Ferrari, Phys. Rev. B 2009, 79, 155417.
M. Lazzeri, F. Mauri, Phys. Rev. Lett. 2006, 97, 266407.
S. Pisana, M. Lazzeri, C. Casiraghi, K. S. Novoselov, A. K. Geim, A. C. Ferrari, Nat. Mater. 2007, 6, 198.
A. Das, S. Pisana, B. Chakraborty, S. Piscanec, S. K. Saha, U. V. Waghmare, K. S. Novoselov, H. R. Krishnamurthy, A. K. Geim, A. C. Ferrari, A. K. Sood, Nat. Nanotechnol. 2008, 3, 210.
M. Bruna, A. K. Ott, M. Ijäs, D. Yoon, U. Sassi, A. C. Ferrari, ACS Nano 2014, 8, 7432.
D. Yoon, Y.-W. Son, H. Cheong, Phys. Rev. Lett. 2011, 106, 155502.
M. R. Kasaai, M. Farzaneh, presented at 23rd Int. Conf. on Offshore Mechanics and Arctic Engineering, Vancouver, British Columbia, Canada, Jun. 2004.
L. Makkonen, J. Adhes. Sci. Technol. 2012, 26, 413.
A. Work, Y. Lian, Prog. Aerosp. Sci. 2018, 98, 1.
J. Lv, Y. Song, L. Jiang, J. Wang, ACS Nano 2014, 8, 3152.
M. J. Kreder, J. Alvarenga, P. Kim, J. Aizenberg, Nat. Rev. Mater. 2016, 1, 15003.
S. B. Subramanyam, V. Kondrashov, J. Rühe, K. K. Varanasi, ACS Appl. Mater. Interfaces 2016, 8, 12583.
P. Archer, V. Gupta, J. Mech. Phys. Solids 1998, 46, 1745.
J. Ocampo, J. Klinger, J. Phys. Chem. 1983, 87, 4325.
I. Golecki, C. Jaccard, J. Phys. C: Solid State Phys. 1978, 11, 4229.
Y. Furukawa, M. Yamamoto, T. Kuroda, J. Cryst. Growth 1987, 82, 665.
D. Beaglehole, D. Nason, Surface Sci. 1980, 96, 357.
H. Bluhm, M. Salmeron, J. Chem. Phys. 1999, 111, 6947.
A. Döppenschmidt, H.-J. Butt, Langmuir 2000, 16, 6709.
K. K. Varanasi, T. Deng, J. D. Smith, M. Hsu, N. Bhate, Appl. Phys. Lett. 2010, 97, 234102.
X. Wei, P. B. Miranda, C. Zhang, Y. R. Shen, Phys. Rev. B 2002, 66, 8.
S. Yamaguchi, Y. Suzuki, Y. Nojima, T. Otosu, Chem. Phys. 2019, 522, 199.
H. Dosch, A. Lied, J. Bilgram, Surf. Sci. 1995, 327, 145.
A. Lied, H. Dosch, J. H. Bilgram, Phys. Rev. Lett. 1994, 72, 3554.
J. Braun, A. Glebov, A. P. Graham, A. Menzel, J. P. Toennies, Phys. Rev. Lett. 1998, 80, 2638.
M. Javan-Mashmool, C. Volat, M. Farzaneh, Hydrol. Processes 2006, 20, 645.
C. G. Salzmann, J. Chem. Phys. 2019, 150, 060901.
K. Morishige, K. Kawano, J. Chem. Phys. 1999, 110, 4867.
K. V. Agrawal, S. Shimizu, L. W. Drahushuk, D. Kilcoyne, M. S. Strano, Nat. Nanotechnol. 2017, 12, 267.
S. Chiashi, Y. Saito, T. Kato, S. Konabe, S. Okada, T. Yamamoto, Y. Homma, ACS Nano 2019, 13, 1177.
Y. Wang, F. Li, Z. Li, C. Sun, S. Wang, Z. Men, Spectrochim. Acta, Part A 2019, 220, 117131.
R. W. Fallon, L. Zhang, A. Gloag, I. Bennion, IEEE Photonics Technol. Lett. 1997, 9, 1616.
J. R. Casas, P. J. S. Cruz, J. Bridge Eng. 2003, 8, 362.
Z. Zhou, M. Huang, J. He, G. Chen, J. Ou, Cold Reg. Sci. Technol. 2010, 61, 1.
J. Luo, Y. Hao, Q. Ye, Y. Hao, L. Li, J. Lightwave Technol. 2013, 31, 1559.
W. Wang, Q. Peng, Y. Dai, Z. Qian, S. Liu, J. Mater. Sci.: Mater. Electron. 2015, 27, 3888.
C. Galiotis, R. J. Young, D. N. Batchelder, J. Polym. Sci.: Polym. Phys. Ed. 1983, 21, 2483.
C. Galiotis, D. N. Batchelder, J. Mater. Sci. Lett. 1988, 7, 545.
I. D. Wolf, Semiconductor Sci. Technol. 1996, 11, 139.
L. H. Wong, C. C. Wong, J. P. Liu, D. K. Sohn, L. Chan, L. C. Hsia, H. Zang, Z. H. Ni, Z. X. Shen, Jpn. J. Appl. Phys. 2005, 44, 7922.
B. Gao, L. Jiang, X. Ling, J. Zhang, Z. Liu, J. Phys. Chem. C 2008, 112, 20123.
T. M. G. Mohiuddin, A. Lombardo, R. R. Nair, A. Bonetti, G. Savini, R. Jalil, N. Bonini, D. M. Basko, C. Galiotis, N. Marzari, K. S. Novoselov, A. K. Geim, A. C. Ferrari, Phys. Rev. B 2009, 79, 205433.
N. Ferralis, J. Mater. Sci. 2010, 45, 5135.
M. Huang, H. Yan, T. F. Heinz, J. Hone, Nano Lett. 2010, 10, 4074.
E. del Corro, M. Taravillo, V. G. Baonza, Phys. Rev. B 2012, 85, 3.
A. C. Ferrari, D. M. Basko, Nat. Nanotechnol. 2013, 8, 235.
C. Neumann, S. Reichardt, P. Venezuela, M. Drögeler, L. Banszerus, M. Schmitz, K. Watanabe, T. Taniguchi, F. Mauri, B. Beschoten, S. V. Rotkin, C. Stampfer, Nat. Commun. 2015, 6, 8429.
P. Lu, X. Wu, W. Guo, X. C. Zeng, Phys. Chem. Chem. Phys. 2012, 14, 13035.
S. Yang, C. Wang, H. Sahin, H. Chen, Y. Li, S.-S. Li, A. Suslu, F. M. Peeters, Q. Liu, J. Li, S. Tongay, Nano Lett. 2015, 15, 1660.
K. Liu, J. Wu, J. Mater. Res. 2016, 31, 832.
A. C. Ferrari, J. C. Meyer, V. Scardaci, C. Casiraghi, M. Lazzeri, F. Mauri, S. Piscanec, D. Jiang, K. S. Novoselov, S. Roth, A. K. Geim, Phys. Rev. Lett. 2006, 97, 187401.
M. Huang, H. Yan, C. Chen, D. Song, T. F. Heinz, J. Hone, Proc. Natl. Acad. Sci. U. S. A. 2009, 106, 7304.
J. E. Lee, G. Ahn, J. Shim, Y. S. Lee, S. Ryu, Nat. Commun. 2012, 3, 1024.
M. Mohr, J. Maultzsch, C. Thomsen, Phys. Rev. B 2010, 82, 201409.
J. Zabel, R. R. Nair, A. Ott, T. Georgiou, A. K. Geim, K. S. Novoselov, C. Casiraghi, Nano Lett. 2012, 12, 617.
A. C. Ferrari, J. C. Meyer, V. Scardaci, C. Casiraghi, M. Lazzeri, F. Mauri, S. Piscanec, D. Jiang, K. S. Novoselov, S. Roth, A. K. Geim, Phys. Rev. Lett. 2006, 97, 18.

* cited by examiner

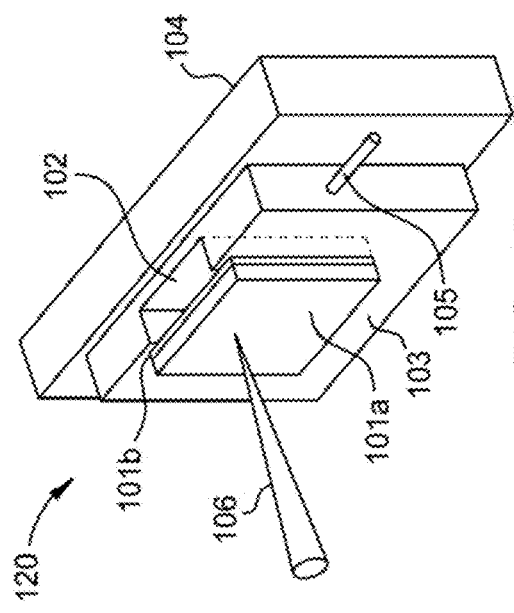
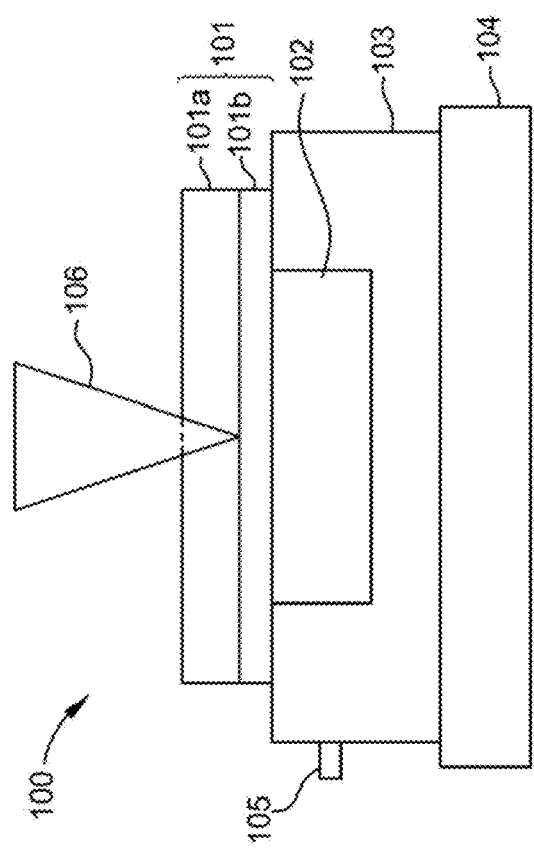
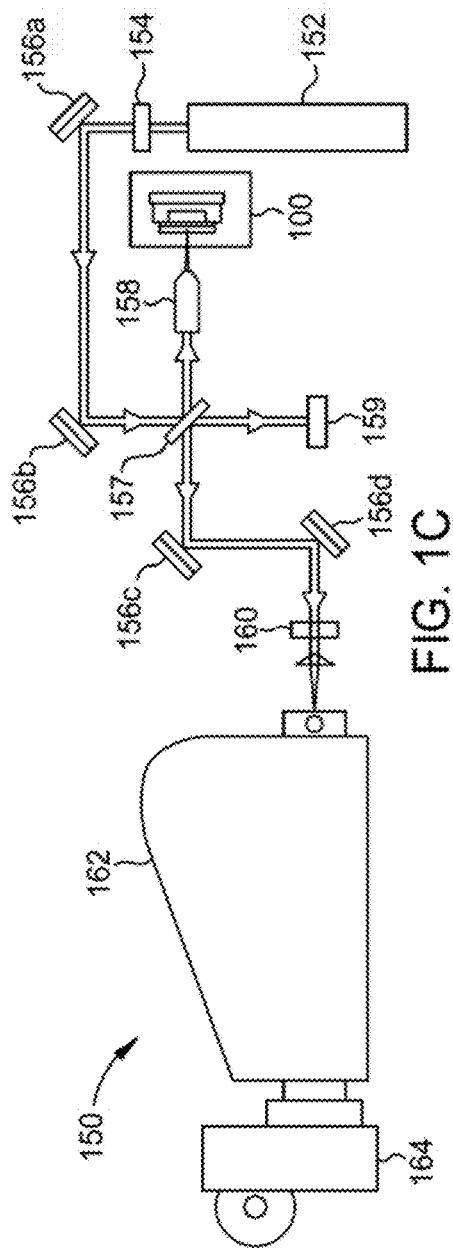
FIG. 1A
FIG. 1B
FIG. 1C

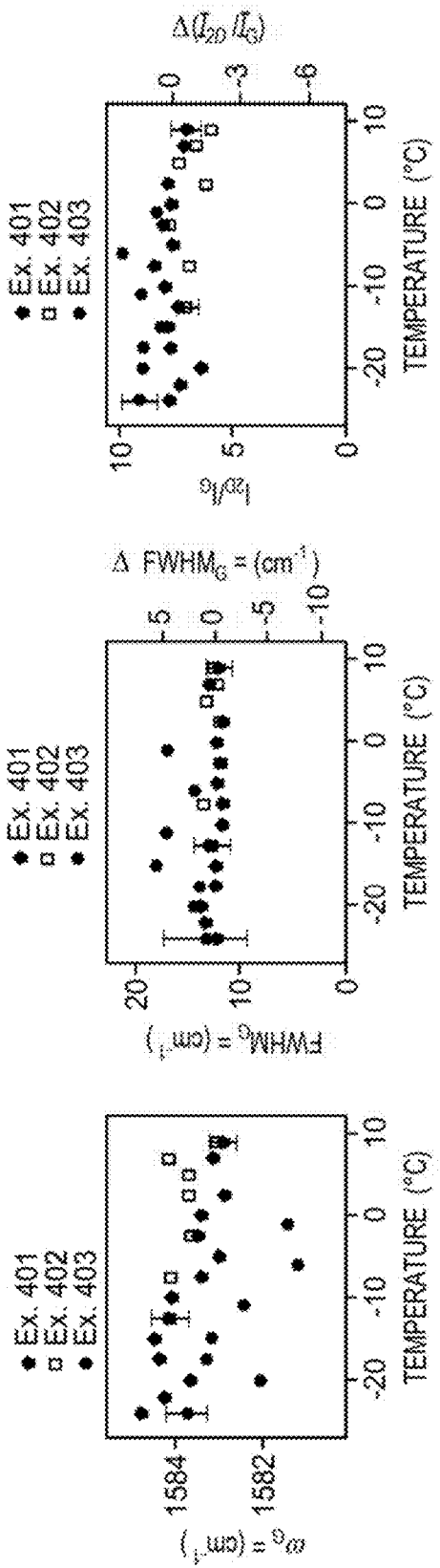
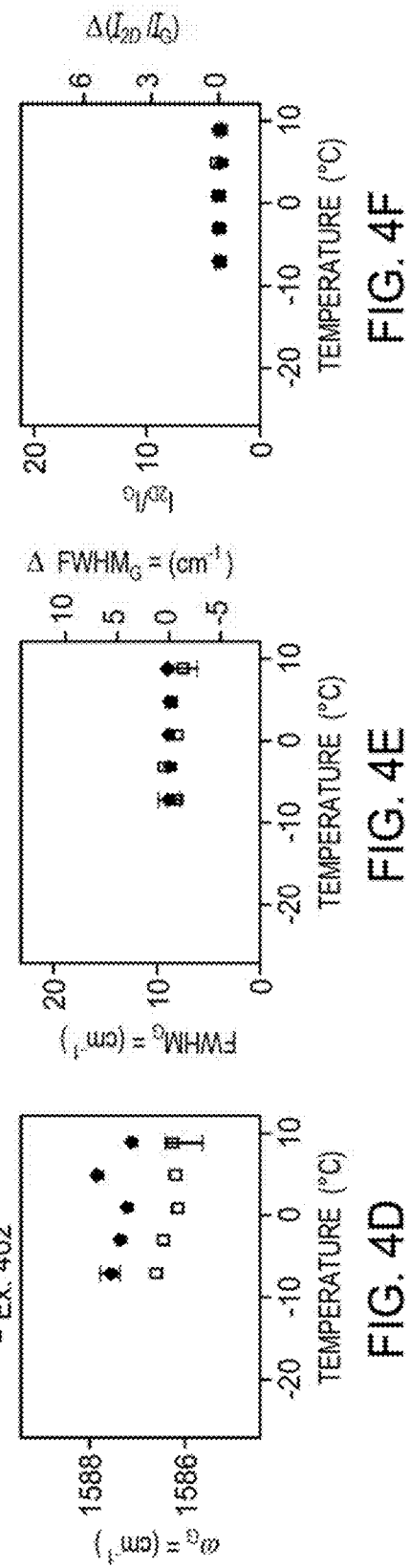
FIG. 4A, FIG. 4B, FIG. 4C, FIG. 4D, FIG. 4E, FIG. 4F

METHOD AND APPARATUS FOR OPTICAL ICE DETECTION

CROSS-REFERENCE TO RELATED APPLICATIONS

This application claims priority to U.S. Provisional Application No. 62/914,437, filed Oct. 12, 2019, which is incorporated herein by reference in its entirety.

BACKGROUND

Field

Embodiments of the present disclosure generally relate to methods and apparatus for optical ice detection.

Description of the Related Art

The formation and accretion of ice are detrimental to several structures, including aircraft, spacecraft, power lines, windmills, ships, telecommunications equipment, and meteorological equipment, thereby impacting a wide variety of industries. Removal or prevention of ice formation on such structures is often desirable and several methods have been adopted. The most common method is to lower the ice adhesion strength to a surface by creating anti-icing surfaces or engineering the material surface at the ice-material interface. However, ice accumulation still occurs despite various materials and engineering advances.

State-of-the-art techniques to measure ice adhesion strength focus on particular materials of material probes with mechanical testing techniques, resulting in a large variation of reported results. Although there are many techniques to measure the adhesive strength between ice and a material probe, the mechanism by which ice adhesion occurs is still not well understood. In addition to concepts and models for theoretically estimating ice adhesion, several experimental techniques have been used to measure ice adhesion strength and a quasi-liquid layer (QLL) that directly affects ice adhesion strength. These experimental techniques have been performed to measure ice adhesion both in the laboratory and the field for naturally-formed ice.

The majority of reported experimental techniques involve mechanical tests like tensile testing, peel testing, blister testing, bending testing, and centrifugal testing, among others. Other techniques used to quantify both ice adhesion strength and the presence of the QLL are laser-pulse induced spallation testing, nuclear magnetic resonance, proton backscattering, ellipsometry, atomic force microscopy, scanning electron microscopy, sum-frequency spectroscopy, glancing-angle x-ray diffraction, helium-atom scattering, and piezoelectric film sensor analysis, among others. However, in all of these techniques, there is no well-defined testing standard, which leads to a high variance in results and introduces concerns about reproducibility as replicating measurements relies upon the formation of new ice which may have different properties than the previous measurement.

Thus, there is a need for methods and apparatus to identify and implement a contactless and non-destructive technique for ice detection which can be implemented into or near ice-sensitive surfaces.

SUMMARY

Embodiments of the present disclosure generally relate to methods and apparatus for optical ice detection.

In an embodiment, an optical ice detection method is provided. The method includes contacting a material probe with water under conditions effective to form ice, obtaining Raman spectra of one or more of the material probe, water, or ice, detecting a shift in the Raman spectra, and calculating ice-induced strain in the material probe.

In another embodiment, an optical ice detection method is provided. The method includes contacting a multilayer structure with water under conditions effective to form ice, the multilayer structure comprising an optically transparent or semi-transparent material disposed over at least a portion of a material probe. The method further includes performing Raman spectroscopy on one or more of the material probe, water, or ice to obtain Raman spectra, detecting a shift in the Raman spectra, and calculating ice-induced strain in the material probe.

In another embodiment, a method of detecting ice is provided. The method includes contacting a multilayer structure with water under conditions effective to form ice, the multilayer structure comprising an optically transparent or semi-transparent material disposed over at least a portion of a material probe, the material probe comprising Si, SiGe, Ge, graphene, carbon nanotubes, transition-metal dichalcogenides, two-dimensional atomic layers from bulk crystals, quantum wells, pressed powders, nanoparticles, quantum dots, or a combination thereof. The method further includes performing Raman spectroscopy on one or more of the material probe, water, or ice to obtain Raman spectra, detecting a change in the Raman spectra, and calculating ice-induced strain in the material probe.

In another embodiment, an apparatus for optically detecting ice is provided. The apparatus includes a multilayer structure comprising an optically transparent layer or semi-transparent layer disposed over at least a portion of a material probe; and a Raman probe to detect a shift in Raman spectra, the Raman probe optically coupled to the multilayer structure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 1A schematically illustrates a side view of an example analytical apparatus used to detect, e.g., the water- and/or ice-induced interfacial effects on a material probe (e.g., graphene) according to at least one embodiment of the present disclosure.

FIG. 1B schematically illustrates a perspective view of the example analytical apparatus of FIG. 1A according to at least one embodiment of the present disclosure.

FIG. 1C schematically illustrates an example analytical setup for detecting and recording, e.g., the water- and/or ice-induced interfacial effects on a material probe according to at least one embodiment of the present disclosure.

FIG. 4A illustrates exemplary strain data for the position of the G peak as a function of temperature for an example SLG only, an example SLG with water, and an example SLG with ice according to at least one embodiment of the present disclosure.

FIG. 4B illustrates exemplary charge transfer data for the position of the G peak as a function of temperature for an example SLG only and an example SLG with water according to at least one embodiment of the present disclosure.

FIG. 4C illustrates exemplary strain data for the FWHM G peak as a function of temperature for an example SLG only, an example SLG with water, and an example SLG with ice according to at least one embodiment of the present disclosure.

FIG. 4D illustrates exemplary charge transfer data for the FWHM G peak as a function of temperature for an example SLG only and an example SLG with water according to at least one embodiment of the present disclosure.

FIG. 4E illustrates exemplary strain data for the integrated ratio of the 2D and G peaks ($I_{2D}/I_G$) as a function of temperature for an example SLG only, an example SLG with water, and an example SLG with ice according to at least one embodiment of the present disclosure.

FIG. 4F illustrates exemplary charge transfer data for $I_{2D}/I_G$ as a function of temperature for an example SLG only and an example SLG with water according to at least one embodiment of the present disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1D:
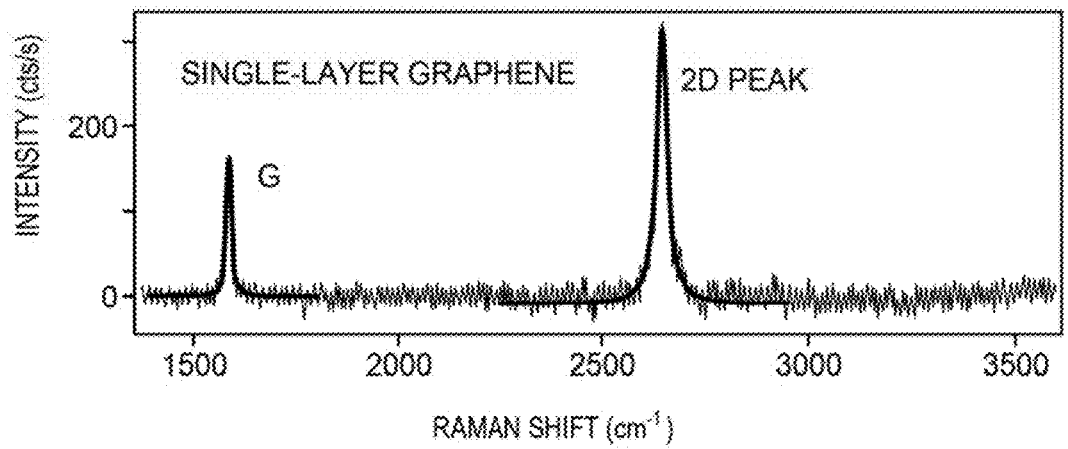
FIG. 1D illustrates an exemplary Raman spectrum of a single-layer graphene (SLG) on quartz with a G peak and 2D peak fit with a Lorentzian function according to at least one embodiment of the present disclosure.

Embodiments of the present disclosure generally relate to methods and apparatus for optical ice detection. Briefly, the methods involve performing Raman spectroscopy on a material probe and/or a sample contacting a material probe, and determining whether ice-induced strain in the material probe is present. The embodiments described herein utilize Raman spectroscopy to contactlessly and non-destructively measure ice-induced strain on the material probe, e.g., single-layer graphene (SLG). To isolate the ice-material probe interface, the material probe vibrational modes (e.g., G and 2D modes) from about 20° C. to about −30° C. are measured with and without ice. Along with the temperature-dependent Raman shift of the material probe, a change in the vibrational frequency of the material probe develops upon ice formation. This change in the Raman shift tracks closely to the temperature-dependent density of ice. Thus, the methods described herein enable optical measurement of ice-induced strain in material probes, e.g., graphene or other material-probe material types. The all-optical techniques described herein for detecting and measuring ice at a monoatomic material interface provides a route for a robust, non-perturbative ice-sensitive sensor, as well as demonstrates a method for determining intrinsic ice properties, especially at two-dimensional interfaces and surfaces.

In some embodiments, the vibrational 2D mode of a material probe with and without ice is used to examine the induced strain that occurs at the material probe-ice interface. In some examples, an unambiguous decrease in the Raman shift occurs when ice forms on the material probe. This downward change in the Raman shift is apparent even between super-cooled deionized water and ice at the same temperature. Thus, embodiments described herein provide a method to optically measure ice-induced strain on a material probe as a function of temperature using Raman spectroscopy.

In some embodiments, a water-mediated charge transfer to the material probe is determined. This water-mediated charge transfer to the material probe manifests as a change of the G peak position when ionized water is added, a low G-feature linewidth, and a small integrated ratio of the 2D and G peaks.

In some embodiments, a method of mapping material-probe regions with and without ice using a Raman probe is provided. The method results in a spatially resolved map of ice-induced strain on a material probe. The method is contactless, non-destructive, and highly localized, and demonstrates, e.g., the feasibility for correlating localized ice behavior with surface morphology and roughness.

Ice formed on a material creates a strain that is indicative of the adhesive strength between the ice and material probe. However, reliably determining the physical properties of ice (e.g., crystal structure, adhesion strength, interfacial state, and molecular orientation) have proven to be both challenging and highly dependent on experiment-specific conditions, including, e.g., surface roughness, ice formation, water purity, and method of measurement. Further, the ability to reliably detect and measure the properties of ice has been a long-standing challenge due its molecular and crystalline complexity, strong dependence on formation parameters, and sensitivity to empirical methods. These challenging material conditions have substantially hindered research in unambiguously determining material behaviors for ice, such as an accurate measure of adhesion strength of ice, which is critical for engineering icephobic surfaces. Additionally, conventional understanding of ice physics is limited in terms of an incomplete phase diagram of the crystalline forms of ice, determining properties of the quasi-liquid layer, probing dimensionally-confined phase transitions of water and ice, and measuring whether or not $H_2O$ molecules in ice are preferentially oriented.

Embodiments described herein enable resolution of a strain created by ice in phase Ih. In contrast to traditional mechanical methods of strain determination, embodiments described herein enable strain measurement in a contactless, non-destructive, and highly spatially resolved manner. In addition, the measurement techniques described herein enable multiple replicated measurements on the same sample, thus reducing the variance in the results. Using the same techniques, an unambiguous change in Raman shift of super-cooled water versus ice at the same temperature can be demonstrated. The techniques described herein can also be utilized to clearly identify and probe the interface between SLG and ice. The ice-induced strain described herein is a lowest measured ice-created strain (or stress) and, to the knowledge of the inventors, the first direct measurement of such low in-situ strain probed locally using Raman spectroscopy. Conventional experiments measure a stress (or strain) response of the ice to an externally applied strain (or stress). In contrast, embodiments described herein measure the strain on the graphene created by the ice. Accordingly, embodiments described enable deducing fundamental properties of the ice.

Raman spectroscopy has been used as an effective tool for determining the strain in a wide variety of materials. When an applied strain is placed on certain semiconductors and carbon-based materials, a shift in, e.g., frequencies and/or vibrational modes occurs. Silicon (Si), silicon germanium (SiGe), single-walled carbon nanotubes, and graphene have been shown to display Raman peak shifts that are directly proportional to the applied strain. For carbon-based materials, the behavior of the characteristic Raman G and 2D features under strain can be identified and the shifts of the G and 2D features have an approximately linear behavior over a range of modest strains.

In Raman spectroscopy, incident light of a known wavelength is scattered from either one or multiple phonons (lattice vibrations) in a system. Given that phonons can be directly related to both the bonding behavior (length, strength, directionality) and temperature of the system, T, changes in the incident and scattered light frequency, traditionally known as a Raman shift:

$$\omega(T) = \omega_{incident} - \omega_{scattered|T},$$

where ω is the photon angular frequency, correspond to alterations in the bonding environment when T is kept constant. Changes in the Raman shift describe alterations in the stress state of materials and/or indicate that a material has undergone strain. Despite its ubiquity in the materials science community, Raman spectroscopy has surprisingly not been used for strain measurements in ice.

The interfacial properties of ice are particularly poorly understood, especially given the ambiguous phase that ice may exhibit at the surface of materials. Herein, two-dimensional materials are used to probe interfacial effects. As an example, carbon-based structures like carbon nanotubes and SLG are used as strain metrics due to their prominent and distinctive Raman features and their large Young's modulus:

$$E = ((stress/strain) = (\sigma/\varepsilon))$$

In some embodiments, the G peak, which is a hallmark of a degenerate $E_{2g}$ phonon created by in-plane lattice vibration of $sp^2$-bonded carbon, and the 2D peak, which stems from a double-phonon virtual process, are both used to demarcate minute changes in the carbon bond lengths (e.g., strain) with a high degree of precision and reproducibility. The dependence of the G peak and 2D peak of SLG is believed to be a function of applied strain: the strain being either uniaxial or biaxial. Conventional approaches apply mechanical strain. However, the embodiments described herein do not apply strain externally to observe the Raman shift as a function of strain. Rather, embodiments of the present disclosure utilize the intrinsic/in situ strain on the material probe due to ice's influence on the material probe. Intrinsic strain can be created by forming ice on the material probe that causes adhesive strain on the material probe. This adhesive strain, which is intrinsic/in situ, is measured by using Raman spectroscopy and probing the Raman shift at the interface between the material probe and ice.

FIG. 1A schematically illustrates a side view of an example apparatus 100 used to detect, e.g., water- and/or ice-induced interfacial effects on a material probe according to at least one embodiment of the present disclosure. FIG. 1B schematically illustrates a perspective view 120 of the example apparatus 100 of FIG. 1A. The example apparatus 100 includes a multilayer structure 101. The multilayer structure 101 includes a substrate 101a disposed over at least a portion of a material probe 101b (e.g., an interfacing material that contacts the ice). The material probe 101b is the object under test. The substrate 101a is typically an optically transparent/semi-transparent layer or material. Although, a multilayer structure is described, a single layer can be used. For example, and for certain material probes, a single material can be used, e.g., thin silicon.

Illustrative, but non-limiting, examples of the substrate include 101a include optically transparent/semi-transparent materials (or layers of optically transparent/semi-transparent materials) such as quartz, glass, diamond, sapphire, zinc selenide, poly(methyl methacrylate) (PMMA), barium borosilicate, borosilicate, alumina, aluminum oxynitride (AlON), magnesium aluminate spinel, yttria ($Y_2O_3$), yttria alumina garnet (YAG), magnesium oxide, air, vacuum, transparent epoxies, or a combination thereof. The substrate 101a can be doped.

Illustrative, but non-limiting, examples of the material probe 101b include semiconductors and carbon-based materials such as Si, SiGe, Ge, graphene (e.g., single layer graphene), carbon nanotubes, transition-metal dichalcogenides, two-dimensional atomic layers from bulk crystals, quantum wells, pressed powders, nanoparticles, quantum dots, or a combination thereof. The material probe can be doped in certain embodiments. Examples of dopant materials include rare-earth elements, transition-metal ions, and atomic and ionic intercalants. In some embodiments, graphene can have ten or fewer atomic layers.

The multilayer structure 101 is disposed over a thermally conductive layer 103. Illustrative, but non-limiting, examples of the thermally conductive layer 103 include one or more metals, one or more metal alloys, one or more crystals, one or more thermally conducting ceramics, one or more thermally conducting polymers, or a combination thereof, such as aluminum, copper, diamond, polysulfone compounds, polyacetylene, polythiophene, graphite, carbon fibers, silver, gold, aluminum nitride, boron nitride, or a combination thereof. The multilayer structure 101 is attached to the thermally conductive layer 103 by, e.g., a thermal paste. A channel 102 is disposed within the conductive layer 103. The channel 102 serves to, e.g., hold a sample, e.g., water and/or ice. At least a portion of the channel 102 is in direct contact with the material probe 101b such that when a sample is placed within the channel 102, at least a portion of the sample within the channel 102 directly contacts the material probe 101b.

The thermally conductive layer 103 is disposed over at least a portion of a temperature control unit 104 (e.g., a thermoelectric cooler, TEC). The temperature control unit 104 serves to, e.g., control the temperature of the sample within the channel 102. For example, the temperature control unit 104 is utilized to freeze water within the channel 102 resulting in the formation of ice directly on the surface of the material probe 101b. Measurements of the water and/or ice within the channel 102 are taken across a broad range of temperatures such as from about −30° C. to about 32° C., such as from about −25° C. to about 12° C., using light 106. The temperature control unit 104 can be an Arduino-controlled TEC. A thermocouple 105 contacts the thermally conductive layer 103. In some examples, the thermocouple 105 is inserted into the thermally conductive layer 103 as close as possible to the sample contained within the channel 102. The thermocouple 105 enables, e.g., the temperature of the sample to be continuously monitored.

FIG. 1C schematically illustrates an example analytical setup 150 for detecting and recording, e.g., the water- and/or ice-induced interfacial effects on a material probe according to at least one embodiment of the present disclosure. The example analytical setup 150 includes an excitation source 152 such as a laser, such as a HeNe laser (~632.8 nm). Light from the excitation source 152 is controlled by an optical device that includes one or more elements along the optical excitation path directed toward the example apparatus 100. Depending upon, e.g., the measurement to be performed, the optical device includes a plasma filter 154, reflecting facets 156a, 156b, and 156c, a beam splitter 157, an objective 158, an optional beam block 159, a notch filter 160, or a combination thereof. The plasma filter 154 attenuates background plasma and/or secondary emissions from the excitation source 152, making the light output from the excitation source 152 more monochromatic. The light is reflected by reflecting facets 156a, 156b, and the beam splitter 157 splits the incident light beam into two or more beams.

After the light is scattered by the object being observed, e.g., the material probe (the object under test) and/or the sample within the channel 102, the objective 158 gathers the light and focuses the light rays to produce signals. The objective 158 can be a single lens or mirror, or combinations of several optical elements. The signals are then reflected by reflecting facets 156c and 156d toward the notch filter 160 which attenuates signals in a specific frequency to low levels, leaving other signals unaltered. The signals are recorded by a spectrometer 162 and a liquid nitrogen cooled CCD camera 164 is used to continuously monitor the water/ice in the channel 102. The geometry of the example analytical setup 150 enables both direct optical access to the material probe 101b without light propagation through the water/ice simultaneous probing of the water/ice in the channel 102.

In use, the material probe 101b of the example apparatus 100 is in direct contact with the sample, e.g., water and/or ice, on one side and optically probed through the substrate 101a on the other side. The example apparatus 100 is excited by light from the excitation source 152. The scattered beam from the sample is collected through the objective 158 and beam splitter 157 and into the spectrometer 162.

Laser power during measurements can be from about 1 mW to about 2 mW, such as from about 1.25 mW to about 1.75 mW, for example about 1.54 mW. In embodiments utilizing a laser as the excitation source 152, the laser is focused through the substrate 101a at the sample within channel 102 with an example spot size of about 1 µm, which can be changed, using the objective 158.

In some embodiments, the apparatus for detecting ice can include Raman modes in fiber optics and waveguides.

In some implementations, control of the laser polarization can be used to determine the type and direction of the ice-created or ice-induced strain. Here, the type (uniaxial and/or biaxial) and direction can be determined using polarization resolution on materials such as graphene and transition-metal dichalcogenides.

The following illustrative, but non-limiting, examples are not intended to limit the scope of embodiments of the present disclosure. For example, although the examples use SLG on quartz, other material probes 101b and substrates 101a can be used as described above. Additionally, depending on the material probe, the interfacial effects of ice and/or water as well as charge carrier density, can be monitored by, e.g., suitable vibrational modes, FHWMs, and ratios of the integrated of the vibrational modes. Further the Raman spectra of the material probe 101b may vary for different samples, different positions on the same sample, different material probes 101b, and different environments of the measurement. The Raman spectra of the material probe 101b alone or in the presence of a sample (e.g., water and/or ice) can also vary based on the various elements of the optical device such as the objective 158.

EXAMPLES

Ice/SLG Assembly.

Chemical vapor deposition grown, single-layer graphene (SLG) positioned on optically transparent quartz was purchased from Graphenea and then mounted to an aluminum block using a thermal paste. This entire ensemble was attached to an Arduino-controlled thermoelectric cooler plate. The temperature was continuously monitored using a thermocouple inserted into the aluminum block as close as possible to the SLG. To prevent frost from forming, the enclosure humidity was set to about zero via a continuous dry-air purge of the system. For the temperature sweep experiments, the transition time between each temperature was about 30 seconds. Temperatures were held for a minimum of about 3 minutes after that to allow for thermal equilibrium to be reached and maintained.

Optical Measurements.

Raman scattering on several SLG flakes was performed by passing a plasma line-filtered, 632.8 nm laser (HeNe) through the quartz. A Mitutoyo 50×(NA=0.42) long-working-distance, infinity-corrected objective was used to both focus the excitation beam and collect the subsequent scattered light. After passing it through a 633 nm Semrock RazorEdge™ ultrasteep long-pass edge filter, the scatter was measured by a Princeton Instruments IsoPlane™ 320SCT spectrometer with a 1200 g/mm grating and a liquid nitrogen cooled PyLon™ charged-coupling device (CCD) camera. An excitation power of 1.54 mW was focused to a 1 µm spot size for the measurements. Using atomic emission lines from a Hg—Xe lamp (calibration lamp), the wavelength was calibrated and the spectral resolution was determined to be about 1.09 cm$^{-1}$.

Spatial Raman Mapping.

To demonstrate the spatial variance in strain in the SLG, a 0.8 mm×1 mm area was scanned on a separate SLG flake in 25 µm steps; this map covered both regions where ice was present or absent. The experimental assembly, including the SLG-on-quartz, was mounted to a five-axis stage with three axes of the Newport 461-XYZ ULTRAlign™ positioner computer controlled with pencil-style actuators. For each spatial location, the SLG 2D Raman spectrum was measured and fit with a Lorentzian function to extract the peak position. To freeze ice for this measurement set, the temperature was dropped 10° C. (the temperature at which deionized water was added) to −15° C. The temperature of −15° C. was then maintained for an additional 30 minutes to ensure thermal equilibration before beginning the scan.

Example 1: Spectroscopic Results

A Raman spectra for the SLG on quartz was taken to verify the quality and uniformity of the SLG. FIG. 1D shows a typical Raman spectra for an example SLG collected at room temperature. The G peak and the 2D peak of the Raman spectra appear at ~1583 cm$^{-1}$ and ~2640 cm$^{-1}$, respectively. A single and sharp 2D peak (without any peak splitting indicating 2D1 and 2D2 modes) that is higher in intensity compared to the G peak confirms measurement of the SLG rather than multilayer graphene or bulk graphite. A Lorentzian fit of the G mode and 2D mode was performed to extract the peak position. The Lorentzian function enables the determination of the position of the Raman frequencies of G ($\omega_G$) and 2D ($\omega_{2D}$) modes, as well as the full width at half maximum, FWHM$_G$ and FWHM$_{2D}$, of the SLG G and 2D features, respectively. Other peak-fitting functions can be utilized such as including Gaussian, Gaussian plus Lorentzian, Voigt, Breit-Wigner-Fano (BWF), and Beta. The appropriate fitting profile(s) can be selected based on the nature of the Raman bands and the material probe.

Figure 1E:
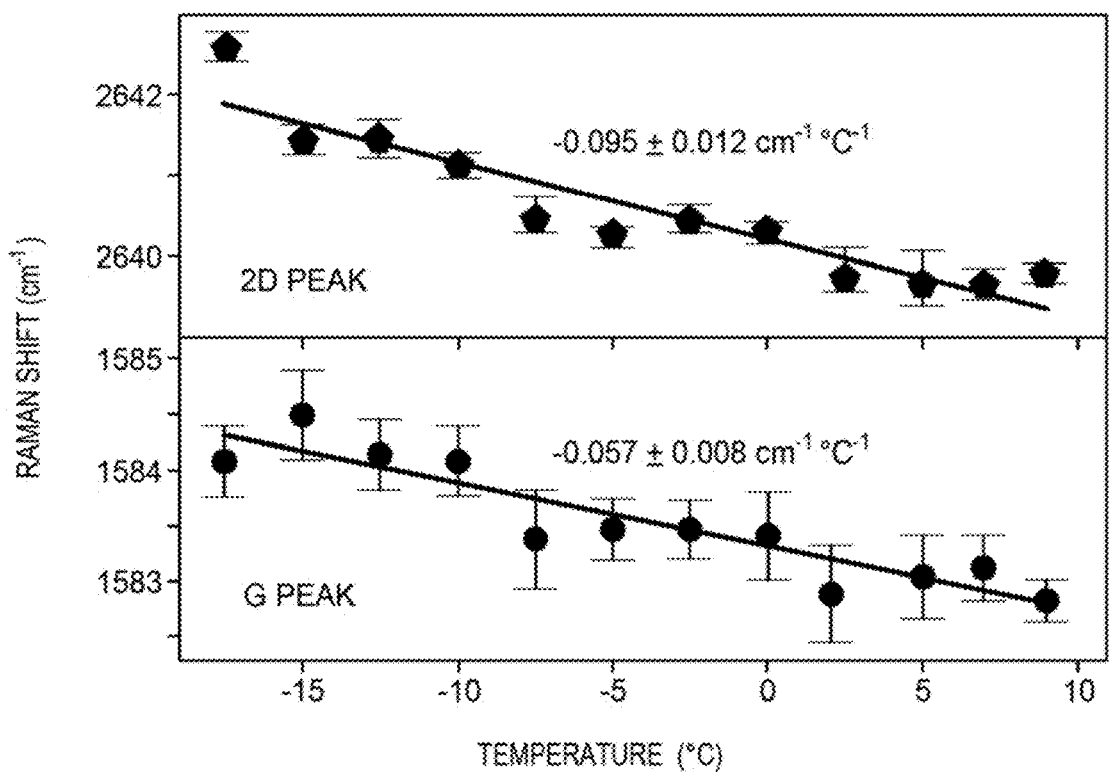
FIG. 1E illustrates exemplary data of a temperature-dependent Raman shift of a 2D peak (top panel) and G peak (bottom panel) of an example SLG according to at least one embodiment of the present disclosure.

It is known that the vibrational modes measured by Raman spectroscopy of graphene undergo a shift due to a change in temperature. To account for the temperature-dependent Raman shift, $\omega(T)$, of graphene vibrational modes, Raman shift measurements of an example SLG over a temperature range from about −25° C. to about 12° C. were performed. The results are shown in FIG. 1E. The temperature-dependent Raman shift of the SLG 2D peak is shown in the top panel of FIG. 1E and the temperature-dependent Raman shift of the SLG G peak is shown in the bottom panel of FIG. 1E. Both the 2D peak and G peak exhibit a linear trend with temperature.

The temperature-dependent change in the vibrational frequency is partially attributed to the change in phonon frequency with temperature and/or the strain induced due to the thermal expansion coefficient mismatch between the SLG and the quartz. For graphene, the 2D peak shows more sensitivity to strain-induced changes in the electronic band structure and shows a weaker dependence on charge carrier density. The higher sensitivity of the 2D peak is observed with its larger rate of change in Raman shift value ($\partial\omega/\partial T$) when compared to the G peak, indicating strain changes more than charge carrier density. In contrast, and for graphene, the G peak is less sensitive to strain-induced changes and is more sensitive to charge carrier density.

Figure 2A:
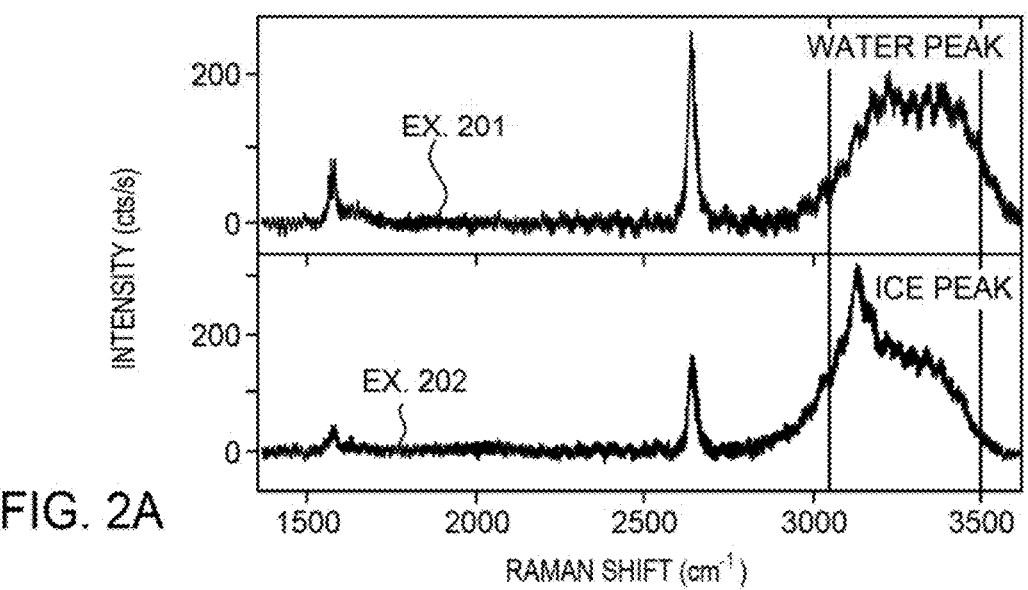
FIG. 2A illustrates exemplary Raman spectra for an example SLG with water (top panel) and an example SLG with ice (bottom panel) according to at least one embodiment of the present disclosure.

FIG. 2A shows the difference in Raman spectrum of an example SLG when water freezes. Specifically, Example 201 shows the Raman spectrum of SLG in the presence of water at temperature (T)=~9.5° C., and Example 202 shows the Raman spectrum of SLG in the presence of ice at T=~−5° C. For the data in FIG. 2A, the channel 102 of example apparatus 100 was filled with deionized water (measured resistivity=~1.5 MΩ-cm) and temperature-dependent Raman measurements were performed. Ice was formed on the surface of the SLG and the Raman shift was determined to measure the strain-induced effect due to ice adhesion. Water is spectroscopically discerned via the broad Raman feature extending between about 3000 cm$^{-1}$ and about 3500 cm$^{-1}$.

The temperature-dependent Raman features in the presence of ice are shifted to higher energy, which indicates the strain caused due to ice adhesion. The presence of ice was determined by the ice peak at a wavelength of about 3150 cm$^{-1}$, and was verified by continuously observing video from a liquid nitrogen cooled CCD camera incorporated in the analytical setup. This quantitative measure enables determination of whether water or ice is present at the SLG interface. The temperature-dependent Raman shift of the 2D peak for the example SLG with and without ice was also used to quantify the effect that the ice adhesion produces on the graphene.

The temperature-dependent measurement accounts for the difference in Raman shift due to ice adhesion, for which the measurement was carried out for SLG with and without ice and correcting for the change due to changing temperature, the net effect resulting from ice adhesion was obtained. Although both the G peak and the 2D peak of SLG showed a temperature-dependent Raman shift, the measurement was constrained to the 2D peak due to a greater shift compared to the G peak.

Figure 2B:
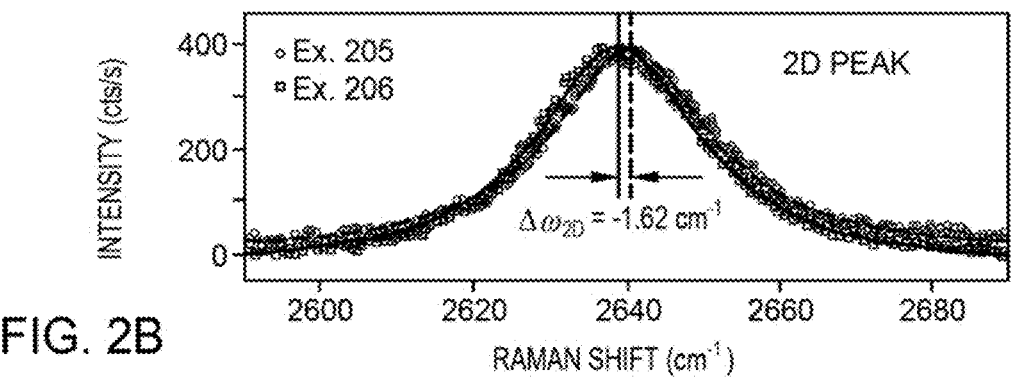
FIG. 2B illustrates an exemplary shift of a 2D peak for an example SLG with and without ice according to at least one embodiment of the present disclosure.

The change in Raman shift due to the formation of ice is shown in FIG. 2B. Specifically, the change in Raman shift ($\Delta\omega$) of the SLG 2D mode at T=~2.5° C. with and without ice was measured. Example 205 and Example 206 refer to a SLG only (SLG without sample) and a SLG with ice, respectively. A negative shift in the SLG 2D frequency, $\Delta\omega_{2D}$, of about −1.62 cm$^{-1}$ was observed when ice formed at the SLG interface. By comparing the SLG 2D mode on the same spot of the SLG at the same temperature with and without ice, the observed change in the vibrational frequency is attributed to ice-induced strain. This decrease in the Raman 2D mode frequency suggests that the SLG is effectively being stretched due to the larger-than-SLG negative expansion coefficient of ice.

Figure 2C:
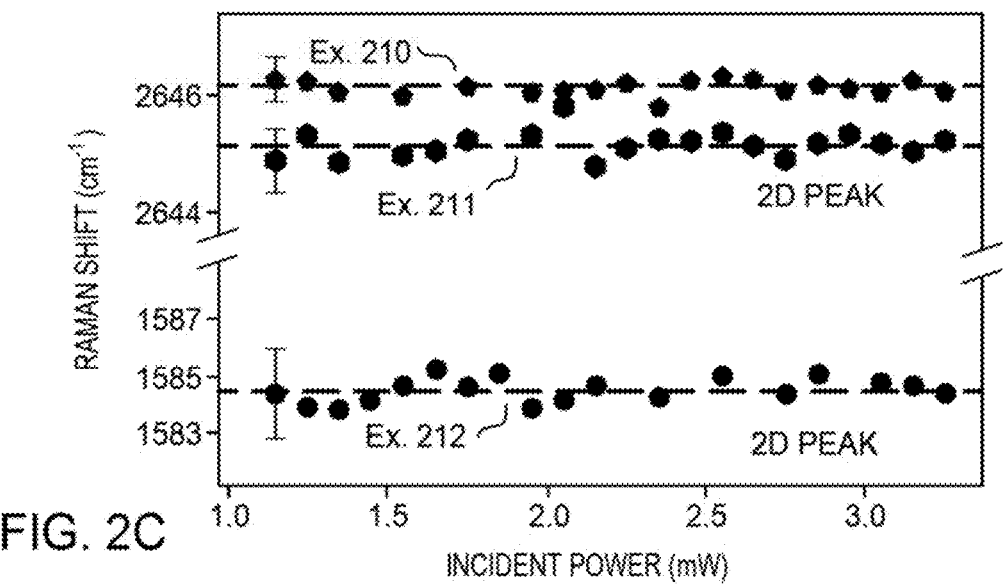
FIG. 2C illustrates exemplary data for the Raman shift of a 2D peak for an example SLG with ice, a 2D peak for an example SLG without ice, and a G peak for an example SLG with ice as a function of power according to at least one embodiment of the present disclosure.

The effects of optical heating on the SLG 2D frequency, $\omega_{2D}$, and the SLG G frequency, $\omega_G$, were also measured. The top two traces of FIG. 2C show the Raman shift of the SLG 2D peak as a function of power for SLG only (Example 210) and SLG with ice (Example 211). The bottom trace of FIG. 2C shows the Raman shift of the SLG G peak as a function of power for the SLG with ice (Example 212). Besides the softening between the SLG-only trend and the SLG-with-ice trend, little to no change in $\omega_{2D}$ was observed. Such behavior of the 2D peak is in agreement with Example 212, where no change in $\omega_G$ was observed when ice formed on the SLG. The lack of change in these three power-dependent curves indicates that optical heating, which manifests as a negative slope in the G peak with increasing temperature, is negligible for the incident power used (about 1.54 mW).

Figure 3A:
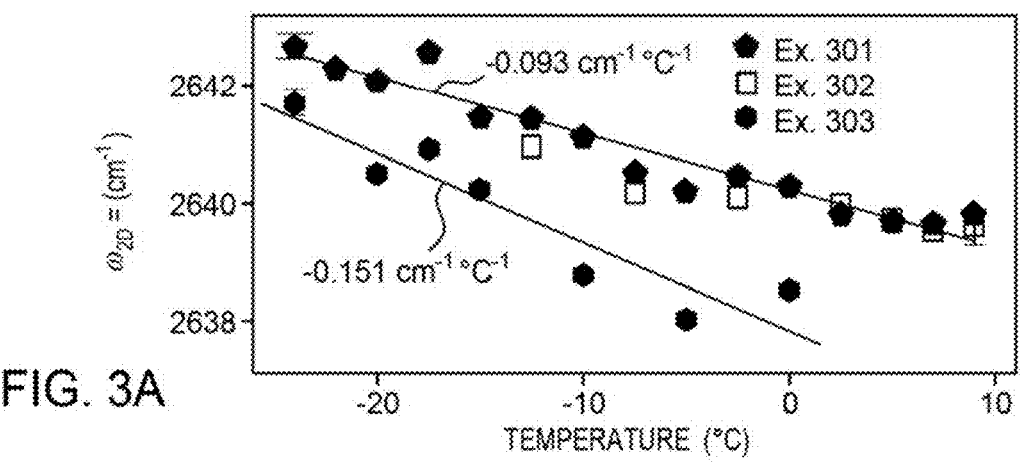
FIG. 3A illustrates an exemplary temperature-dependent Raman shift of the 2D peak for an example SLG only, an example SLG with water, and an example SLG with ice according to at least one embodiment of the present disclosure.

The ice-induced strain was further examined by performing temperature-dependent measurements. In some embodiments, the temperature dependence of the graphene G peak and 2D peak was obtained with the channel 102 remaining empty, at least partially filled with water, or at least partially filled with ice. Results of such temperature dependence are shown in FIG. 3A In FIG. 3A, Example 301, Example 302, and Example 303 refer to the SLG only, the SLG in the presence of water, and the SLG in the presence of ice, respectively. The data in FIG. 3A was obtained by first measuring the G and 2D SLG modes as a function of temperature without water or ice (Example 301). As shown by Example 301 in FIG. 3A, the temperature-dependent Raman shift for the 2D mode of SLG shows a linear trend with temperature coefficient ~−0.093 cm$^{-1°}$ C.$^{-1}$. The same measurement was repeated but the channel 102 of example apparatus 100 was filled with water to form ice as the temperature decreases. The data points of Example 302 represent the signal obtained when the channel 102 contains water. Although some of the data points are below the freezing point of water for Example 302, no formation of ice was observed. Rather, it was a super-cooled water. Even when the water is super-cooled, the observed SLG 2D shift falls nearly exactly on top of the SLG-only vibrational frequencies. The lack of change in the Raman positions for SLG when deionized water is introduced indicates that the $\Delta\omega_{2D}$ due to water-created strain and water-mediated charge transfer is negligibly small here, indicating that the Raman shift for SLG is not altered due to the presence of water. However, the change in Raman position was very different upon ice formation on the surface of the SLG (Example 303). When ice forms, the 2D peak position decreases and the temperature-dependent slope also significantly increases in magnitude. The Raman shift to a higher energy due to formation of ice on the surface of SLG indicates ice-induced strain in the SLG.

Figure 3B:
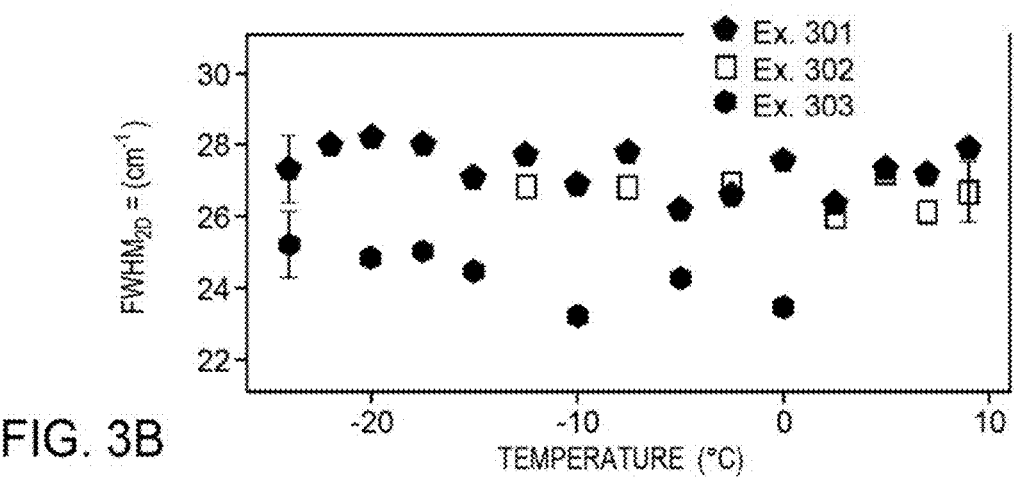
FIG. 3B illustrates exemplary full width at half maximum (FWHM) data for the 2D peak for an example SLG only, an example SLG with water, and an example SLG with ice according to at least one embodiment of the present disclosure.

The SLG FWHM$_{2D}$ also exhibited a distinct decrease when ice forms. As shown by Example 301 and Example 302 in FIG. 3B, the FWHM$_{2D}$ is unchanged when water (normal or super-cooled) is present. However, the FWHM$_{2D}$ drops by ~4 cm$^{-1}$ when ice forms (Example 303), which is similar to biaxial tensile-strained SLG (little to no change in FWHM$_{2D}$), but differs from uniaxially-applied strain (where FWHM$_{2D}$ increases). Because FWHM$_{2D}$ is composed of a contribution from the natural or homogeneous transition of the charge carrier density and from the slightly differing environments of the carriers probed by the incident beam (inhomogeneous) used, the decrease in the FWHM$_{2D}$ indicates that the SLG area being probed is becoming more uniform and flat. It is believed that the strain created by the ice formation and subsequent expansion slightly stretches the SLG, causing a reduction in the uneven morphology of the SLG. Thus, the decrease in FWHM$_{2D}$ observed upon the formation of ice indicates that the inhomogeneity of the SLG is being smoothed by ice-created biaxial tensile strain.

When ice forms, the SLG Raman 2D peak, $\omega_{2D}$, drops by about 2 cm$^{-1}$ near the ice-water transition point. To more clearly understand this shift in the SLG 2D peak position, the difference in $\partial\omega_{2D}/\partial T$ for the SLG-only conditions and SLG-with-ice conditions was calculated. To estimate the $\Delta\omega_{2D}$, the temperature-dependent slope of the SLG-only 2D mode was determined and then subtracted from the SLG-with-water and SLG-with-ice frequencies.

The SLG and ice have negative temperature expansion coefficients while quartz has a positive temperature expansion coefficient. As a result, a mismatch is created between the temperature expansion coefficient in quartz and SLG for the SLG-only condition. This interplay between the expansion and contraction of the SLG-quartz system is removed by subtracting the temperature-dependent $\Delta\omega_{2D}$ for SLG-only from the $\Delta\omega_{2D}$ of the SLG-with-water and SLG-with-ice systems. For the SLG-ice condition, there is a slight temperature dependence to $\Delta\omega_{2D}(T)$, with an average change in the 2D Raman frequency from about 0° C. to about −20° C. of about −1.69 cm$^{-1}$.

The strain-induced shift in Raman frequency is defined in terms of the Grüneisen parameter, γ, for biaxial strain, and is given by Equation (1):

$$\gamma = -(1/2\omega_0)(\partial\omega/\partial\epsilon)$$

where $\omega_0$ is the Raman frequency without strain, ω is the Raman frequency with strain, and ε is the biaxial strain given by the sum of its longitudinal and transverse component. There are several values of γ(=3.8±0.3; 3.54; 2.98), reported at room temperature. It is believed that the temperature dependence of the Grüneisen parameter for the SLG 2D mode has no significant change in γ values at 1.4 K, 77 K, and 300 K, which covers the temperature range of the embodiments described herein. In at least one embodiment, the difference in the Raman shift with and without ice for 2D mode of SLG, $\Delta\omega_{2D}$, is used to calculate the ice-induced strain, ε, using Equation 1 with previously reported γ values.

where $\omega_0$ is the Raman frequency without strain, ω is the Raman frequency with strain, and ε is the biaxial strain given by the sum of its longitudinal and transverse component. There are several values of γ (=3.8±0.3; 3.54; 2.98), reported at room temperature. It is believed that the temperature dependence of the Grüneisen parameter for the SLG 2D mode has no significant change in γ values at 1.4 K, 77 K, and 300 K, which covers the temperature range of the embodiments described herein. In at least one embodiment, the difference in the Raman shift with and without ice for 2D mode of SLG, $\Delta\omega_{2D}$, is used to calculate the ice-induced strain, ε, using Equation 1 with previously reported γ values.

Figure 3C:
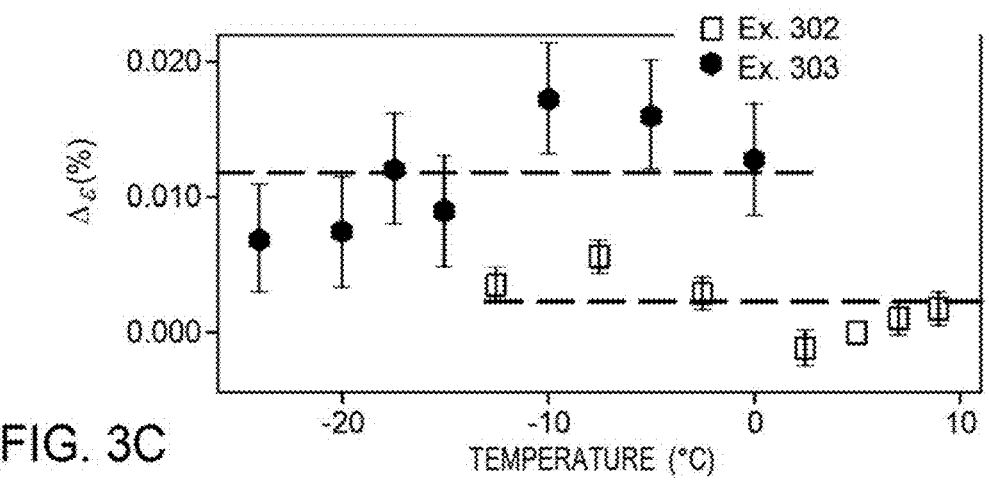
FIG. 3C illustrates exemplary data for the calculated SLG strain, Δε, as a function of temperature from changes in the Raman 2D peak upon introduction of water and ice according to at least one embodiment of the present disclosure.

FIG. 3C illustrates exemplary data for the calculated SLG strain, Δε, as a function of temperature from changes in the Raman 2D peak upon introduction of water and ice. By performing temperature-dependent measurements with and without ice/water, $\omega_0$ in Equation 1 is determined for each temperature at the same spatial location on the SLG. When ice is formed on the quartz-supported SLG from T=~0° C. to ~−20° C., the ice-induced strain was calculated to be, on average, ~0.012% (using Grüneisen parameter of 2.6). In the embodiments described herein, the calculated strain using the change in Raman shift is unlike previous works where the strain/stress is mechanically applied to observe the change in Raman shift.

Assuming that the small average SLG strain value of 0.012% is within the linear elastic SLG deformation regime, the two-dimensional strain energy density, $u_{2D}$, can be calculated. $u_{2D}$ (in first order) is equal to $(\frac{1}{2})E_{2D}\epsilon^2$, a quantity equivalent to the work per unit area done by the ice on the SLG. Here, the two-dimensional Young's modulus, $E^{2D}=E*t_{SLG}$, where $t_{SLG}$ is the thickness of the SLG, is 340 N/m for SLG. Using this value, $u_{2D}$ is estimated to be about 2.4 μJ/m$^2$ for the temperature-averaged strain value of 0.012%. As a comparison to a different, but related quantity, the adhesion energy (amount of energy released when a material brought from infinitely far away is interfaced with a secondary material) of SLG-to-quartz has been estimated to be 0.45 J/m$^2$. This relatively large adhesion energy is attributed to the liquid-like tendency of SLG to adhere strongly to surfaces, which may also affect the ability of ice to strain the SLG. The estimated $u_{2D}$ value, therefore, provides a measure of the relative relationship of SLG-to-ice and SLG-to-quartz, while also guiding an understanding of the relaxation of the SLG back to its original state once the ice has been removed. Additionally, unlike conventional destructive mechanical tests, the methodology enables determination of the temperature-dependent interfacial strain and $u_{2D}$ values from the exact same physical configuration.

Example 2: Effects of Charge Transfer

In addition to strain, variations in the electron concentration can cause changes in the Raman spectrum of SLG. It is known that $\omega_G$ stiffens as the absolute value of the Fermi energy, $|E_F|$, increases from charge transfer. This behavior has previously been explained by the inability of excited electrons to relax back to their ground-state momenta, which creates a violation of the adiabatic Born-Oppenheimer approximation and therefore a removal of the Kohn anomaly from the Γ point. The failure of the adiabatic Born-Oppenheimer approximation not only increases $\omega_G$, but also decreases $FWHM_G$ via the inhibited phonon relaxation into electron-hole pairs due to Pauli blocking. Besides $\omega_G$ stiffening and $FWHM_G$ decreasing, when SLG is tunably gated (intentional charge transfer), the integrated ratio of the 2D and G peaks, $I_{2D}/I_G$, significantly decreases to ~1 as the electron concentration (either through hole or electron doping) increases. These behaviors, as well as examining the $\omega_{2D}$ to $\omega_G$ slope, intentionally inducing charge transfer onto or off of SLG, and utilizing polarized Raman spectroscopy, enable water-mediated charge transfer to be distinguished from ice-induced strain.

FIGS. 4A, 4C, and 4E show the behavior of SLG only, SLG with water, and SLG with ice for ice-induced strain, respectively. FIGS. 4B, 4D, and 4F show the behavior of SLG only, SLG with water, and SLG with ice, respectively, for water-mediated charge transfer. Example 401, Example 402, and Example 403 refer to SLG only, SLG with water, and SLG with ice, respectively. 1.5 MΩ-cm water was used for the strain measurements and 0.006 MΩ-cm water was used for the charge-transfer measurements.

FIG. 4A and FIG. 4B show the position of the G peak, $\omega_G$, as a function of T for SLG only, SLG with water, and SLG with ice. In FIG. 4A, $\omega_G$ changes from the temperature-dependent SLG-only case when ice is formed, similar to that observed with $\omega_{2D}$. In contrast, when ions are intentionally included in water, a significant shift in $\omega_G$ is observed when water is introduced into the system (FIG. 4B). This decrease in $\omega_G$ when water is introduced indicates that the electron concentration of the SLG is changing: the softening of the G peak points to an already-doped SLG (due to repeated measurements with ionized water) moving closer to $|E_F|$ due to p-type doping from ionized water. Thus, $\omega_G$ for strain and charge transfer show marked differences. Just like for $\omega_{2D}$, the strain case shows no difference between SLG only (Ex. 401) and SLG with water (Ex. 402), while a substantial decrease in $\omega_G$ is observed in the charge transfer case upon the introduction of water.

Similar behaviors are seen in the data of FIG. 4C and FIG. 4D. In the ice-induced strain case of FIG. 4C, the $FWHM_G$ remains at about 13 cm$^{-1}$ with a slight increase upon ice formation, while in the charge transfer case of FIG. 4D, the $FWHM_G$ is at about 9 cm$^{-1}$ with small changes observed when water is introduced. The change in the $FWHM_G$ for both cases is small, however, the overall magnitude of the $FWHM_G$ for the strain case is higher than for the charge transfer scenario, indicating that the Fermi energy is far from 0 for the latter.

Charge transfer was also tested by determining the ratio of the integrated areas of the 2D and G Raman features ($I_{2D}/I_G$). Typically, a large (>3) $I_{2D}/I_G$ ratio occurs when the Fermi energy is at or close to 0. However, the $I_{2D}/I_G$ ratio drops significantly to about 1 as the carrier concentration passes about $5\times10^{12}$ cm$^{-2}$. FIG. 4E shows that $I_{2D}/I_G$ ratio is about 7 for both the SLG-only conditions (Ex. 401) and SLG-with-water conditions (Ex. 402). A slight increase in the $I_{2D}/I_G$ ratio to about 9 is observed when the ice is formed as shown by Ex. 403. In contrast, when charge transfer is present (FIG. 4F), the $I_{2D}/I_G$ ratio is about 1.9, which agrees with the data presented in FIG. 4B and FIG. 4D.

It is possible that charge transfer to/from the SLG exists when water transitions to ice, since spectroscopic signatures, e.g., $\Delta\omega_{2D}$ (FIG. 2 and FIG. 3), change at this transition. However, it is believed that such a scenario is unlikely because water should not have a markedly weaker charge transfer probability than ice. Additionally, as previously mentioned, when introducing water and then ice to initially pristine SLG, $\Delta\omega_{2D}$ was not only positive, but also large (~10 cm$^{-1}$). Thus, using the same SLG, water, and experimental setup, a sign inversion is observed for $\Delta\omega_{2D}$ over multiple freeze-thaw cycles, which suggests that the adhesion of the SLG to the quartz substrate is changing and not that charge transfer to/from the SLG is suddenly reversing its behavior. As such, it is believed that the observed spectroscopic signatures are due to strain and not charge transfer.

Spatial Mapping of Ice-Induced Strain

In some embodiments, a method of mapping, e.g., SLG, regions with and without ice using a Raman probe is provided. The method results in a spatially resolved map of ice-induced strain on a material probe 101b, demonstrating, e.g., the feasibility for correlating localized ice behavior with surface morphology and roughness. The method is contactless, non-destructive, and highly localized.

Figure 5A:
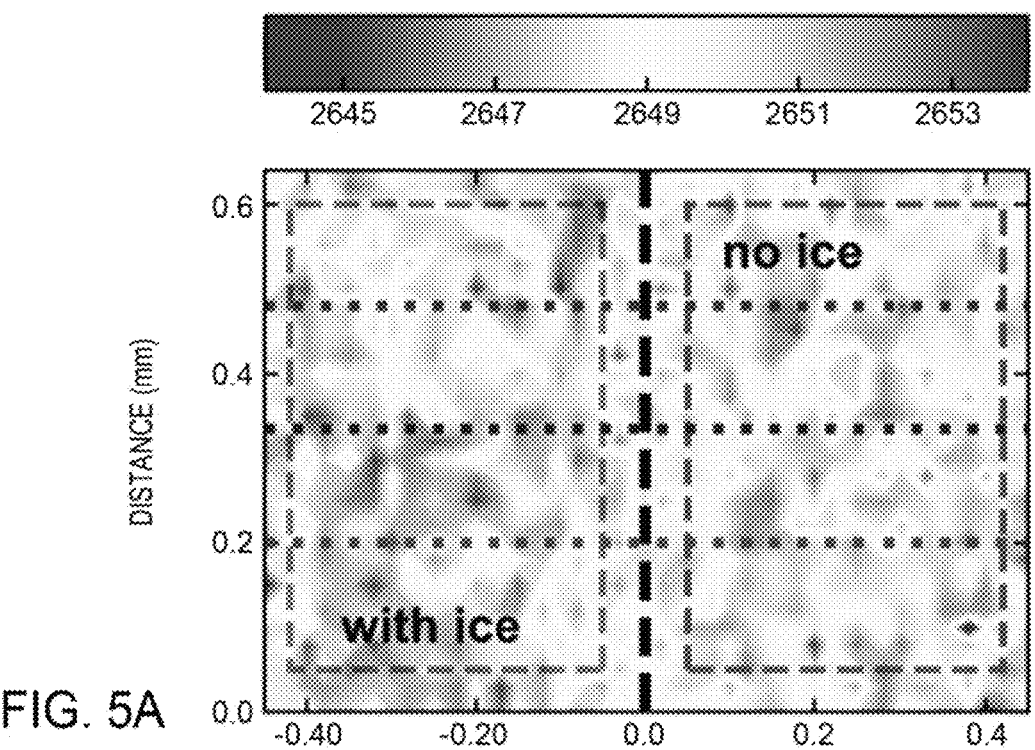
FIG. 5A illustrates exemplary two-dimensional mapping data 2D peak position extracted from the fit for every 25 μm steps of an example SLG with and without ice according to at least one embodiment of the present disclosure.

Here, two-dimensional mapping was utilized to detect spatial variations in strain. FIG. 5A shows the results of a two-dimensional mapping of the SLG with ice (blue region) and without ice (red/orange/yellow region) at a temperature of about −15° C., which indicates the difference in the 2D mode of graphene with and without ice. Each point in the two-dimensional mapping plot shown in FIG. 5A is the 2D peak position extracted from the Lorentzian fit to the Raman spectrum taken at a spatial position on SLG with and without ice for each 25 μm step. The dashed black line separating the region of ice (left) from no ice (right) is determined by the presence of the Raman ice peak at 3150 cm$^{-1}$. For this experiment, the channel was partially filled such that both the region containing ice and the region that did not contain ice were mapped. The Raman spectra were collected and analyzed to obtain the peak position of the 2D feature.

The two-dimensional mapping results show that regions of the SLG that are in contact with ice (x<0) exhibit a peak position that is on average 2648.2 cm$^{-1}$ whereas the peak position of the 2D feature in the right portion of the map (x>0) exhibit a peak position of approximately ~2650.3 cm$^{-1}$, a difference of ~−2.1 cm$^{-1}$. Despite the point-by-point variability, the difference between the region with and without ice is readily observable: an average decrease in $\omega_{2D}$ of ~2.1 cm$^{-1}$ when ice is present on the SLG. This decrease of ~2.1 cm$^{-1}$ in the 2D mode frequency when ice is present is attributed to ice-induced interfacial strain. Although not shown, a decrease in $FWHM_{2D}$ in this region is also observed.

Figure 5B:
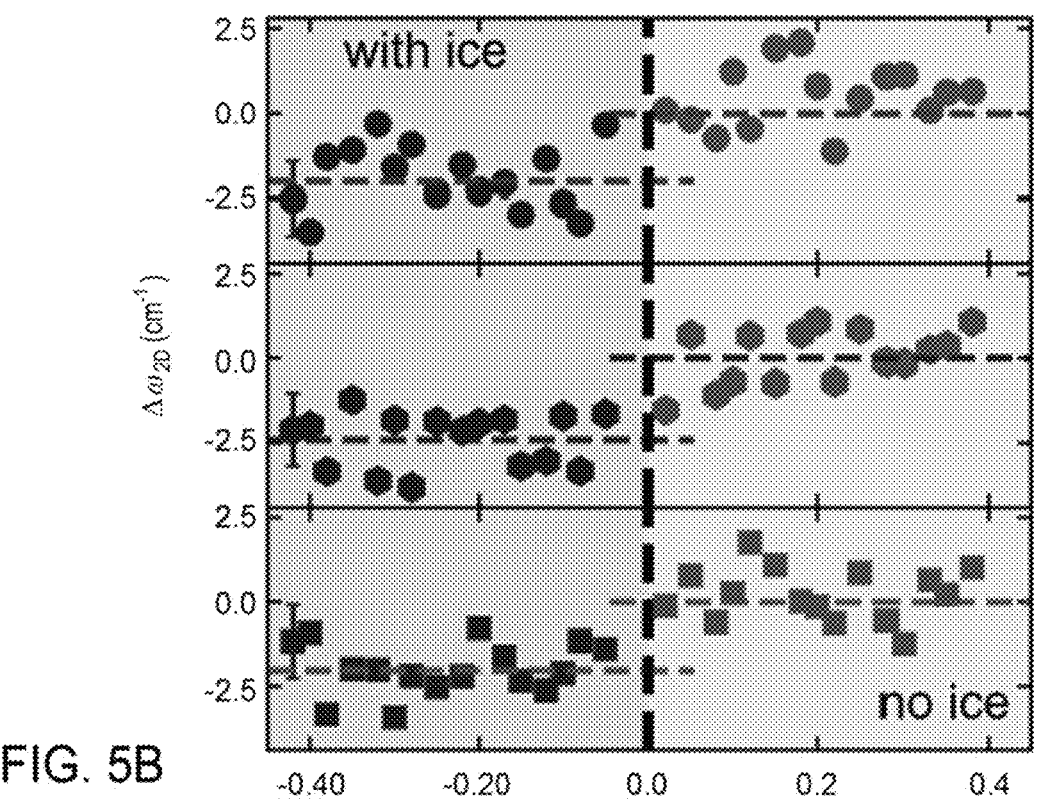
FIG. 5B shows exemplary data of the difference in the 2D peak position extracted from the two-dimensional mapping shown in FIG. 5A according to at least one embodiment of the present disclosure.

Individual cuts through the 2D mode Raman map are shown in FIG. 5B. Specifically, FIG. 5B shows the difference in the 2D peak position of the SLG with and without ice, $\Delta\omega_{2D}$, extracted from the three dashed lines in FIG. 5A.

For clarity, only the first point on the left for a given panel has an error bar. Regardless of where these slices through the data set are taken, a sharp drop in $\omega_{2D}$ is observed when scanning from the region of SLG-only to the region of SLG-ice. Taking the average of panels 1 through 3, the average ice-induced strain in graphene is about 0.015%, which corresponds to an average $<u_{2D}>$ of about 3.8 µJ/m².

Compared to the temperature-dependent Raman shift taken at a single point on SLG, the two-dimensional mapping result, which was performed at different locations on SLG including both ice and no ice at the same temperature, the difference in the Raman shift obtained in both cases was similar. This is again because of the ice-induced strain in graphene.

Overall, embodiments of the present disclosure illustrate that the formation of ice creates a strain on the underlying material-probe surface. The ice-induced strain can then be detected using optical methodologies described herein. The optical method for detecting ice-induced strain, Raman spectroscopy, is a non-destructive, contactless technique capable of locally probing the interface between the material probe (e.g., SLG) and ice. The embodiments of the disclosure enable an optical ice detection technique and methods for estimating ice induced strain (ice adhesion strength). It is also contemplated that various embodiments and aspects of the disclosure may be implemented in a device, apparatus, or other sensor to measure ice adhesion strength.

The descriptions of various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable one of ordinary skill in the art to understand the embodiments disclosed herein.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a layer" include aspects comprising one, two, or more layers, unless specified to the contrary or the context clearly indicates only one layer is included.

While the foregoing is directed to embodiments of the present disclosure, other and further embodiments of the disclosure may be devised without departing from the basic scope thereof, and the scope thereof is determined by the claims that follow.

What is claimed is:

1. An optical ice detection method, comprising:
   contacting a multilayer structure with water under conditions effective to form ice, the multilayer structure comprising an optically transparent or semi-transparent material disposed over at least a portion of a material probe;
   performing Raman spectroscopy on one or more of the material probe, the water, or the ice to obtain Raman spectra;
   detecting a shift in the Raman spectra; and
   calculating ice-induced strain in the material probe.

2. The method of claim 1, further comprising:
   continuously or intermittently monitoring a temperature of the water.

3. The method of claim 1, wherein detecting the shift in the Raman spectra comprises:
   obtaining a first Raman spectra of one or more of the material probe and the water at a first temperature;
   fitting peaks of the first Raman spectra with a peak-fitting function;
   obtaining a second Raman spectra of one or more of the material probe and the water at a second temperature, wherein the second temperature is different from the first temperature; and
   fitting peaks of the second Raman spectra with a peak-fitting function.

4. The method of claim 3, wherein the first temperature, the second temperature, or both, are below the freezing point of water.

5. The method of claim 3, wherein the first temperature, second temperature, or both, are below the freezing point of super-cooled water and ice.

6. The method of claim 1, wherein detecting the shift in the Raman spectra comprises monitoring a frequency of a Raman 2D peak, a full width at half maximum of a Raman 2D peak, or a combination thereof.

7. The method of claim 1, wherein detecting the shift in the Raman spectra comprises monitoring a frequency of a Raman G peak, a full width at half maximum of the Raman G peak, or a combination thereof.

8. The method of claim 1, further comprising detecting water droplets, a charge density of the water, or a combination thereof.

9. The method of claim 8, wherein detecting the charge density of water comprises detecting a change in a frequency of a Raman G peak.

10. The method of claim 1, wherein:
    the material probe comprises Si, SiGe, Ge, graphene, carbon nanotubes, transition-metal dichalcogenides, two-dimensional atomic layers from bulk crystals, quantum wells, pressed powders, nanoparticles, quantum dots, or a combination thereof; or
    the optically transparent or semi-transparent material comprises quartz, glass, diamond, sapphire, zinc selenide, poly(methyl methacrylate) (PMMA), barium borosilicate, borosilicate, alumina, aluminum oxynitride (AlON), magnesium aluminate spinel, yttria ($Y_2O_3$), yttria alumina garnet (YAG), magnesium oxide, air, vacuum, transparent epoxies, or a combination thereof; or
    a combination thereof.

11. The method of claim 10, wherein the material probe is graphene.

12. The method of claim 10, wherein the optically transparent or semi-transparent material is quartz.

13. The method of claim 1, wherein:
the material probe is silicon; and
the optically transparent or semi-transparent material is silicon.

14. The method of claim 1, further comprising determining a type and a direction of the ice-induced strain using polarization resolution, wherein the type comprises uniaxial or biaxial.

15. A method of detecting ice, comprising:
contacting a multilayer structure with water under conditions effective to form ice, the multilayer structure comprising an optically transparent or semi-transparent material disposed over at least a portion of a material probe, the material probe comprising Si, SiGe, Ge, graphene, carbon nanotubes, transition-metal dichalcogenides, two-dimensional atomic layers from bulk crystals, quantum wells, pressed powders, nanoparticles, quantum dots, or a combination thereof;
performing Raman spectroscopy on one or more of the material probe, the water, or the ice to obtain Raman spectra;
detecting a change in the Raman spectra; and
calculating ice-induced strain in the material probe.

16. The method of claim 15, wherein detecting the change in the Raman spectra comprises:
obtaining a first Raman spectra of one or more of the material probe and the water at a first temperature;
fitting peaks of the first Raman spectra with a peak-fitting function;
obtaining a second Raman spectra of one or more of the material probe and the water at a second temperature, wherein the second temperature is different from the first temperature; and
fitting peaks of the second Raman spectra with a peak-fitting function.

17. The method of claim 15, wherein detecting the change in the Raman spectra comprises monitoring a frequency of a Raman 2D peak, a full width at half maximum of a Raman 2D peak, or a combination thereof.

18. An apparatus for optically detecting ice, comprising:
a multilayer structure comprising an optically transparent layer or semi-transparent layer disposed over at least a portion of a material probe, the material probe comprising Si, SiGe, Ge, graphene, carbon nanotubes, transition-metal dichalcogenides, two-dimensional atomic layers from bulk crystals, quantum wells, pressed powders, nanoparticles, quantum dots, or a combination thereof; and
a Raman probe to detect a shift in Raman spectra, the Raman probe optically coupled to the multilayer structure.

19. The apparatus of claim 18, wherein the optically transparent or semi-transparent material comprises quartz, glass, diamond, sapphire, zinc selenide, poly(methyl methacrylate) (PMMA), barium borosilicate, borosilicate, alumina, aluminum oxynitride (AlON), magnesium aluminate spinel, yttria ($Y_2O_3$), yttria alumina garnet (YAG), magnesium oxide, air, vacuum, transparent epoxies, or a combination thereof.

20. The apparatus of claim 18, wherein:
the material probe is graphene; and
the optically transparent or semi-transparent material is quartz.

* * * * *